(12) United States Patent
Chambliss et al.

(10) Patent No.: US 9,032,484 B2
(45) Date of Patent: May 12, 2015

(54) ACCESS CONTROL IN A HYBRID ENVIRONMENT

(75) Inventors: David D. Chambliss, Morgan Hill, CA (US); Joshua W. Knight, Mohegan Lake, NY (US); Ronald K. Kreuzenstein, Sunnyvale, CA (US); John J. Lee, Scotts Valley, CA (US); James A. Ruddy, San Jose, CA (US); John G. Thompson, Tucson, AZ (US); Harry M. Yudenfriend, Pouighkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/285,757

(22) Filed: Oct. 31, 2011

(65) Prior Publication Data

US 2013/0111557 A1    May 2, 2013

(51) Int. Cl.
*H04L 29/06* (2006.01)
*G06F 9/46* (2006.01)
*G06F 21/62* (2013.01)
*G06F 9/54* (2006.01)

(52) U.S. Cl.
CPC ............ *G06F 9/468* (2013.01); *G06F 21/6236* (2013.01); *G06F 9/54* (2013.01)

(58) Field of Classification Search
CPC ......... G06F 21/00; G06F 21/44; G06F 21/62; G06F 21/6218
USPC .............................. 726/4; 709/202
See application file for complete search history.

(56) References Cited

U.S. PATENT DOCUMENTS

| | | | |
|---|---|---|---|
| 4,847,754 A | 7/1989 | Obermarck et al. | |
| 5,319,782 A | 6/1994 | Goldberg et al. | |
| 5,850,426 A * | 12/1998 | Watkins et al. ............ | 379/29.01 |
| 5,926,833 A | 7/1999 | Rasoulian et al. | |
| 6,173,360 B1 * | 1/2001 | Beardsley et al. ............ | 711/111 |
| 7,065,765 B2 | 6/2006 | Cadden et al. | |
| 7,219,198 B2 | 5/2007 | Sivaram et al. | |
| 7,444,667 B2 | 10/2008 | Bulusu et al. | |
| 7,836,228 B1 | 11/2010 | Moir et al. | |
| 7,882,202 B2 | 2/2011 | Alvarez et al. | |
| 8,131,860 B1 | 3/2012 | Wong et al. | |

(Continued)

FOREIGN PATENT DOCUMENTS

| | | |
|---|---|---|
| WO | 2010089222 A1 | 8/2010 |
| WO | 2012158890 A1 | 11/2012 |

OTHER PUBLICATIONS

Watson, "A Decade of OS Access-Control Extensibility", Feb. 1, 2013, Communications of ACM, p. 52-63.*

(Continued)

*Primary Examiner* — Taghi Arani
*Assistant Examiner* — Gregory Lane
(74) *Attorney, Agent, or Firm* — Cantor Colburn LLP; William A. Kinnaman, Jr.

(57) ABSTRACT

A heterogeneous computing system includes a first server module having a first operating system, a second server module communicatively coupled to the first server module, the second server module having a second operating system dissimilar to the first operating system, a data set accessible by the first server module and the second server module; and a process residing on the first server module, the process configured to grant access to the second server module, from the first server module, to the data set.

14 Claims, 3 Drawing Sheets

(56) References Cited

U.S. PATENT DOCUMENTS

| | | | |
|---|---|---|---|
| 8,161,330 | B1 | 4/2012 | Vannatter et al. |
| 8,170,968 | B2 | 5/2012 | Colclough et al. |
| 2003/0208706 | A1 | 11/2003 | Roddy et al. |
| 2004/0139142 | A1 | 7/2004 | Arwe |
| 2006/0059228 | A1 | 3/2006 | Kasamsetty et al. |
| 2007/0162449 | A1 | 7/2007 | Manolov et al. |
| 2008/0189352 | A1 | 8/2008 | Mitchell et al. |
| 2008/0215767 | A1 | 9/2008 | Nagami et al. |
| 2009/0217103 | A1 | 8/2009 | Borelli et al. |
| 2009/0222599 | A1 | 9/2009 | Lehr et al. |
| 2010/0023521 | A1 | 1/2010 | Arcese et al. |
| 2010/0228789 | A1* | 9/2010 | Macedo ......................... 707/803 |
| 2010/0275203 | A1 | 10/2010 | Shinohara et al. |
| 2010/0287554 | A1 | 11/2010 | Amundsen et al. |
| 2010/0306394 | A1* | 12/2010 | Brown et al. .................. 709/229 |
| 2010/0313208 | A1 | 12/2010 | Zarzycki et al. |
| 2010/0332776 | A1 | 12/2010 | Uchikado et al. |
| 2011/0061093 | A1* | 3/2011 | Korkus et al. ...................... 726/4 |
| 2011/0099166 | A1 | 4/2011 | Mugundan et al. |
| 2011/0208798 | A1* | 8/2011 | Murrell et al. ................. 709/202 |
| 2011/0252173 | A1* | 10/2011 | Armstrong et al. ........... 710/305 |
| 2012/0005763 | A1* | 1/2012 | Stefik et al. ...................... 726/30 |
| 2012/0096078 | A1 | 4/2012 | Coates et al. |
| 2012/0151063 | A1 | 6/2012 | Yang et al. |
| 2012/0174191 | A1* | 7/2012 | Wood ................................ 726/4 |
| 2013/0085985 | A1 | 4/2013 | Maxfield |

OTHER PUBLICATIONS

Combined Search and Examination Report under Sections 17 and 18(3) for GB Application No. GB1216252.5 mailed 8 Jan. 13, 2013, 5 pgs.
Combined Search and Examination Report under Sections 17 and 18(3) for GB Application No. GB1216252.5 mailed 8 Jan. 13, 5 pgs.
International Search Report and Written Opinion for International Application No. PCT/IB2012/055499 mailed 29 Jan. 13, 6 pgs.
Gaitonde et al., "Model and Architecture for Diagnostic Requests in a Heterogeneous Distributed Environment", IP.com IPCOM000122033D, Apr. 4 2005, pp. 1-7.
Disclosed Anonymously, "Avoidance of working storage stack data diagnostic information invalidation when handling an error condition or gathering First Failure Data Capture information", IP.com IPCOM00019489D, Apr. 12, 2010, pp. 1-4.
IBM; "ITCAM Agent for WebSphere Application: Configuring and using TTAPI"; IBM To=-ivoli Composite Application Manager for Application Diagnostics, Version 7.1.0.1; 2009-2010; 46 pgs.
Abstract of Japanese Publication No. JP2000322306A, Publication Date: Nov. 24, 2000; Applicant: Fujitsu Ltd, 1 pg.
Abstract of Japanese Publication No. JP2000311063A, Publication Date: Nov. 7, 2000 Applicant: Hitachi Ltd, 1 pg.
Tero Hasu, "Implementing Jini Servers without Object Serialization Support", Autumn 2002, pp. 1-17. Located at http://www.tml.hut.fi/Studies/T-110.557/2002/papers/.

\* cited by examiner

ACCESS CONTROL IN A HYBRID ENVIRONMENT

BACKGROUND

The present invention relates to computing systems, and more specifically, to systems and methods for access to data resources in multi-mainframe or hybrid computing environments.

In a typical multi-mainframe computing environment, a mainframe can include multiple servers. For example, in a System z hybrid environment, an IBM® System z mainframe (e.g., zEnterprise® 196) is coupled to IBM® blades housed in one or more IBM® BladeCenters®. The coupling is accomplished by Ethernet networks via Transmission Control Protocol/Internet Protocol (TCP/IP). If any data needs to be transferred from the mainframe to a server, the data passes over the Ethernet network. Applications in specific servers, which involve high volume and high speed data transfers, such as database accesses (e.g., via Direct Access Storage Devices (DASD)) within the multi-mainframe computing environment can perform considerable processing that may impact other work in a mainframe.

With a suitable channel implementation on a server coordinating the data transfers, it is possible for the coordinating server and other servers within the mainframe to share access to the same database storage devices (e.g., DASD). As such, the coordinating server can directly access the data and load the data without requiring much mainframe processing or transfer over the Ethernet network.

In the mainframe running a multi-mainframe operating system that manages concurrently hosted units of work (e.g., z/OS®), there are mechanisms (e.g., Resource Access Control Facility by IBM®) to ensure that only authorized users are allowed to access the data prior to transferring it to the coordinator server. However, no such mechanisms exist on many servers, which do not run the multi-mainframe operating system. Also there is a concern that software running on the server could make unauthorized accesses to data on the DASD devices.

SUMMARY

Exemplary embodiments include a computer program product including a non-transitory computer readable medium storing instructions for causing a computer to implement a heterogeneous operating system data access method. The method includes receiving, in a first computing system, a request to access a data set, sending, in the first computing system, an instruction to access the data set, locating, in the first computing system, the data set, issuing, in the first computing system, a request to access the data set and accessing, in the first computing system, the data set.

Further exemplary embodiments include a heterogeneous operating system, including a first server module having a first operating system, a second server module communicatively coupled to the first server module, the second server module having a second operating system dissimilar to the first operating system, a data set accessible by the first server module and the second server module and a process residing on the first server module, the process configured to grant access to the second server module, from the first server module, to the data set.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In exemplary embodiments, the systems and methods described herein enable software running on a server module to make authorized accesses to DASD devices. In exemplary embodiments, the systems and methods described herein drive commands that control the devices that are represented in the I/O configuration established on the server module. Devices cannot be accessed unless they are in this configuration. In exemplary embodiments, the systems and methods described herein drive commands that also control the extents on a device that may be accessed by the server module and the kinds of accesses that are permitted to those extents.

Figure 1:
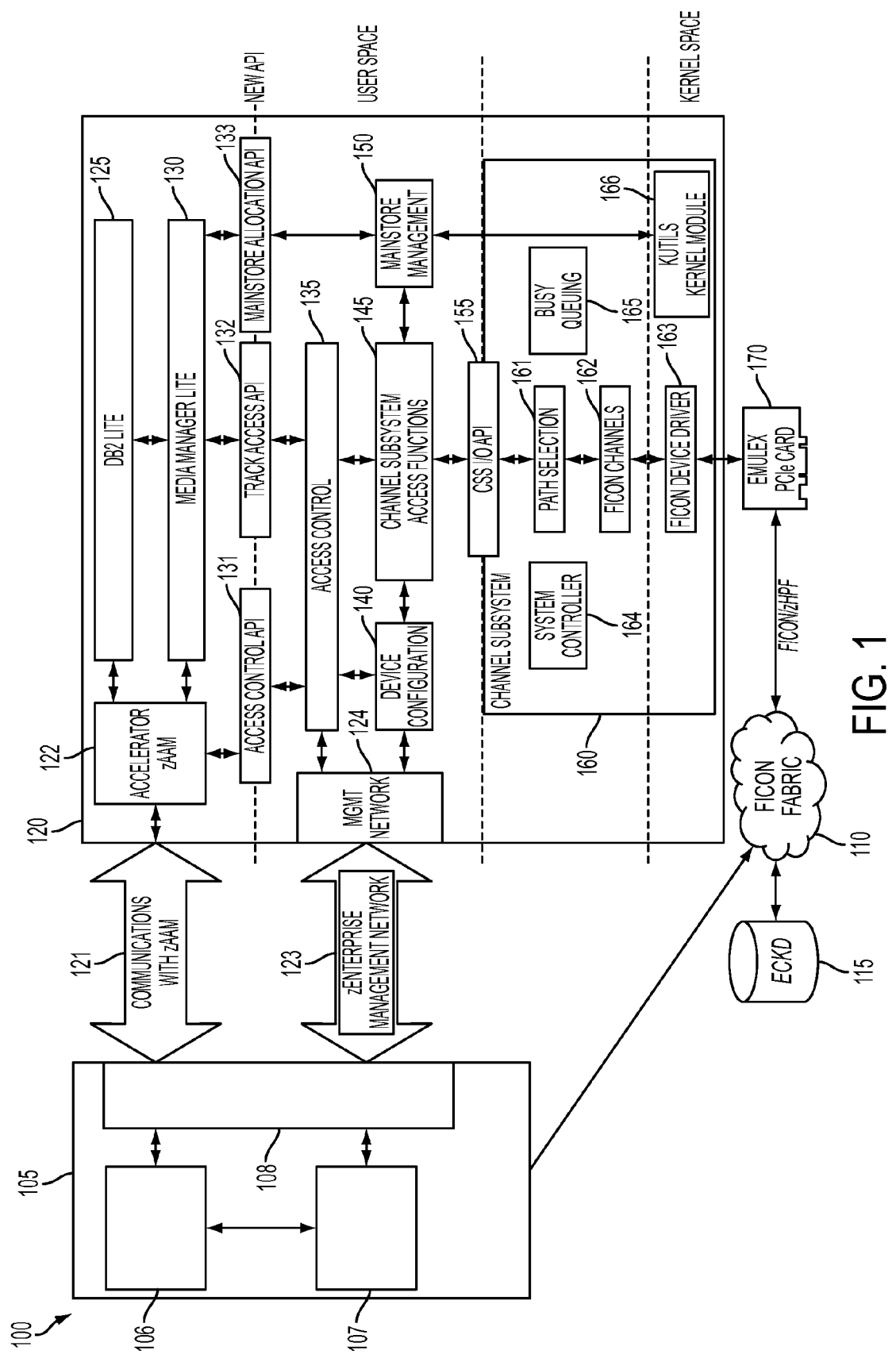
FIG. 1 illustrates an exemplary system in which data access authorized accesses can be made.

FIG. 1 illustrates an exemplary system 100 in which data access authorized accesses can be made. The system 100 can be part of a larger multi-mainframe system that may be part of a single logical system (e.g., a parallel Sysplex® configuration), each of the mainframes having multiple server modules. For illustrative purposes, one server module (i.e., first server module 105) of a mainframe is illustrated. The server module 105 runs an operating system that can support multiple workloads (e.g., z/OS®). The server module 105 supports data access over a suitable communication channel 110 (e.g., Fiber Connection (FICON)) to a data set 115. The operating system that supports multiple workloads (e.g., z/OS®) ensures that only authorized users are allowed to access the data set 115. The system 100 also includes a second server module 120 that runs an operating system (e.g., Linux) differing from the operating system running on the first server module 105. In the hybrid system 100, the operating system running on the second server module 120 does not have authorized access components. In exemplary embodiments, the systems and methods described herein provide authorized access for the second server module 120.

It will be appreciated that several different hybrid applications are contemplated in exemplary embodiments. For illustrative purposes, the server module 105 includes a relational database application (i.e., a first application) 106, a media management application (i.e., a second application) 107, which are both coupled to a load accelerator application 108 supported in the operating system that can support multiple workloads (e.g., z/OS®). Corresponding components on the second server module 120 provide the functionality for data access to the data set 115 as further described herein.

In exemplary embodiments, the load accelerator application 108 includes a communications channel 121 with a load accelerator application 122 supported in the operating system (e.g., Linux) on the server module 120. The load accelerator application 108 also includes a communications channel 123 with a management network application 124 residing on the second server module 120. The second server module 120 includes a relational database application (i.e., a first companion application to the first application) 125 coupled to a media management application (i.e., a second companion application to the second application) 130, respectively similar to the relational database application 106 and the media management application 107 residing of the first server module 105. The relational database application 125 and the media management application 130 include similar functionality as the relational database application 106 and the media management application 107 such that the functions can be mirrored in the system 100. The server module 120 further includes an access control module 135 that polices requests and sets up permissions as described further herein. The access control module 135 is coupled to the load accelerator application 122 via an access control application programming interface (API) 131. The access control module 135 is also coupled to the media management application 130 via a track access API 132. The access control module 135 is further coupled to a device configuration module 140 and a channel subsystem access functions module 145, which is also coupled to the device configuration module 140. The channel subsystem access functions module 145 is further coupled to a mainstore management module 150 that is coupled to the mainstore allocation API 133. The channel subsystem access functions module 145 is also coupled to a channel subsystem (CSS) I/O API 155. The system 100 further includes a channel subsystem 160 coupled to the CSS I/O API 155. The channel subsystem 160 interfaces with a hardware card 170 that ultimately provides access to the suitable communication channel 110 and to the data set 115. The channel subsystem 160 includes a path selection module 161 coupled to the CSS I/O API 155, a channel module 162 coupled to the path selection module 161 and a device driver 163 coupled to the channel module 162 and the hardware card 170. The channel subsystem 160 further includes a system controller 164 that provides channel control functions, a busy queue module 165 to manage channel requests and a kernel module 166 coupled to the mainstore management module 150, and which provides kernel functions.

Figure 2:
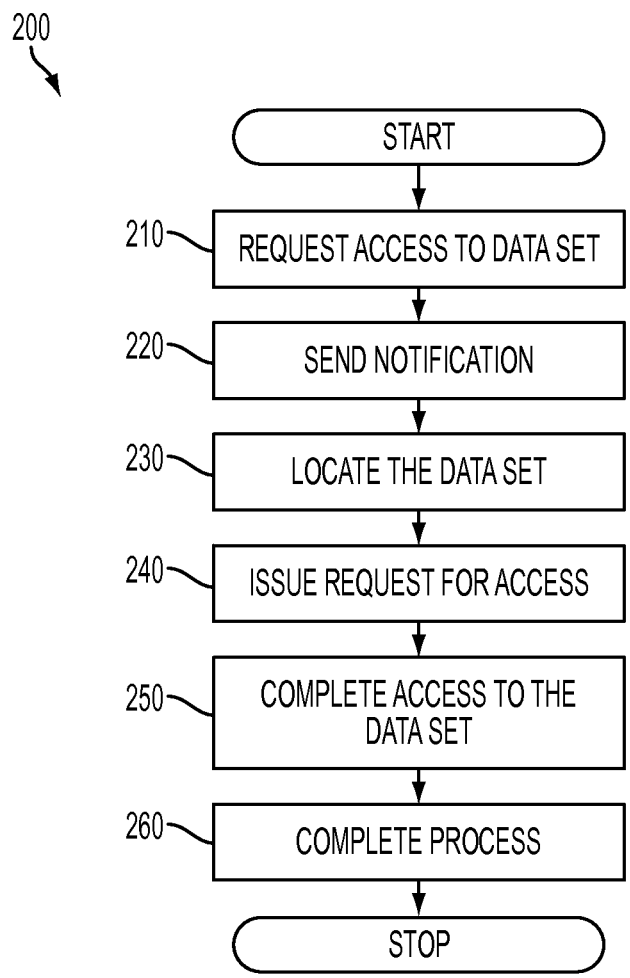
FIG. 2 illustrates a flowchart for a data access method in accordance with exemplary embodiments.

As described further herein, the components of the second server module 120 are driven by components of the first server module 105. In one example, the relational database application 106 on the first server module 105 loads data from the data set 115 to the second server module 120. It will be appreciated that many other examples of data access are further contemplated. An overview of the process for data access is described with respect to FIG. 2 that illustrates a flowchart for a data access method 200 in accordance with exemplary embodiments. Further details of the method 200 are described thereafter.

In exemplary embodiments, when the second server module 120 is ready to access the data set 115, the second server module 120 requests access to the data set at block 210. For example, the relational database application 125 is ready to access the data set 115. At block 210, the second server module 120 sends the notification. For example, the relational database application 125 sends a notification to the media management application 130 to access the data set 115. At block 230, the second server module 120 (e.g., the media management application 130) locates the data set 115. At block 240, the second server module 120 issues a request for access to the data set 115. For example, the media management application 130 sends a request to the access control module 135 as described herein. At block 250, the second server module 120 accesses and completes the access to the data set 115. At block 260, the second server module 120 cleans up after access to the data set 115 as further described herein. Further details of the method 200 are now described with respect to the example discussed above.

In exemplary embodiments, the relational database application 106 on the first server module 105 sends a request to the relational database application 125 on the second server module 120 via the load accelerator application 108, communications channel 121 and the load accelerator application 122. The relational database application 125 instructs the media management application 130 to obtain data from the data set 115. In order to locate the data, the media management application 130 communicates with the media management application 107 on the first server module 105 via the load accelerator application 108, communications channel 121 and the load accelerator application 122. In the system, serialization is a mechanism that ensures that multiple conflicting accesses to the data 115 set are serialized so that the integrity of the data is preserved. As such, the media management application 107 performs serialization steps, security checks and other functions to prepare the data for access by the second server module 120. In addition, the media management application 107 determines volumes and extents in the data set 115 in which the data resides. The load accelerator application 108 communicates with the access control module 135 via the communications channel 123 and the management network application 124 to pass the volume and track information for the data. The access control module 135 sets up permissions that allow access to portions of the relational database that reside on the dataset 115. After the access control module 135 sets up the permissions, it responds to the load accelerator application 108 via the communications channel 123. The media management application 107 on the first server module 105 responds to the connect request from the media management application 130 on the second server module 120, indicating the location (volumes and extents) of the data to be loaded. The response is transmitted via the load accelerator application 108, communications channel 121 and the load accelerator application 122. The media management application 130 on the second server module 120 issues track access requests to the access control application 135 via the track access API 132. The access control application 135 checks that each track access request from the media management application 130 has permission to access the data at the location specified. The access control application 135 passes the track access request to the channel subsystem access functions module 145. The channel subsystem access functions module 145 interacts with the channel subsystem 160 via the CSS I/O API 155 to read a track of data from the data set 115 into a memory area specified by the media management application 130. The channel subsystem access functions module 145 responds to the media management application 130 via the track access API 132 when the track access request is complete. The media management application 130 responds to the relational database application 125 on the second server module 120 on when the data it requested has been loaded. The media management application 130 cleans up after access by communicating to the media management application 107 on the first server module 105 via the load accelerator application 108, communications channel 121 and the load accelerator application 122. During this cleaning process, the load accelerator application 108 communicates with the access control application 135 on the second server module 120 via the communication channel 123. The access control application 135 removes permissions, via the load accelerator application 108, for the relational database data residing on the data set 115. The access control application 135 then responds to the load accelerator application 108 via the communication channel 123. The media management application 107 then releases (i.e., unlocks) the serialization mechanism and performs other functions to free the data on the data set 115 for access by other users. The media management application 107 on the first server module 105 responds to the disconnect request from the media management application 130 on the second server module 120, via the load accelerator application 108, communications channel 121 and the load accelerator application 122. The relational database application 125 on the second server module 120 coordinates other components on the second server module 120 to process the retrieved data. The relational database application 125 on the second server module 120 then notifies the relational database application 106 on the first server module 105 when the loading and processing of the data is complete.

During the data access methods described herein, I/O devices accessed by the first and second server modules 105, 120 are identified during many of the operations including but not limited to: 1) when the load accelerator application 108 or the relational database application 106 communicates with components on the second server module 120 (e.g., the relational database application 125, the media management application 130 and the access control module 135); 2) when the media management application 130 makes requests via the track access API 132; 3) when the access control module 135 checks permissions or removes access permissions at the request of the network application 124; and 4) when the channel subsystem access functions module 145 determines which subchannel to implement for performing track access functions requested by media management application 130. In exemplary embodiments, the system 100 can identify device using either an absolute device identifier or using a device handle.

In exemplary embodiments, the absolute device identifier is a way of uniquely identifying a device. It is used by the operating system on the first server module 105 components when communicating with components on the second server module 120. For example, the device identifier can be 34 bytes and includes fields including but not limited to: 1) a node descriptor—32 bytes; 2) a control unit image—1 byte; and 3) a unit address—1 byte.

In exemplary embodiments, the load accelerator application 108 identifies devices on the second server module 120 by providing an absolute device identifier. In order to have a compact and unambiguous method to refer to I/O devices in the configuration, a "device handle" is assigned by the device configuration module 140 to each device in the I/O configuration on the second server module 120. For example, the device handle is an opaque 64-bit number that can be used by the channel subsystem access functions module 145 to efficiently locate a channel in the channel subsystem 160. It is also used in access control database records. The device handle is communicated back to the load accelerator 108 in the response to requests that includes a device in the configuration or provides access permissions. The device handle is also used by the media management application 130 when making track access requests. The device handle can be assigned such that the access control module 135 and the channel subsystem access functions module 145 can quickly locate the control blocks they need when performing track access operations for the media management application 130.

In exemplary embodiments, the system 100 determines the device handle corresponding to an absolute device identifier in situations including, but not limited to: 1) when the access control module 135 receives a request from the load accelerator module 108 containing an absolute device identifier; and 2) when the media management application 130 needs to determine the device handle corresponding to an absolute device identifier. A translation function is provided for this purpose. The load accelerator application 108 uses an absolute device identifier for communicating with the device configuration module 140 and the access control module 135. The load accelerator application 108 receives a device handle in the response to such requests. For example, the load accelerator application 108 may pass the device handle to the media management application 130. By passing the device handle. Performance can be improved because the media management application 130 won't have to use the translation function to obtain the device handle before making a track access request. In addition, the media management application also does not have to know the absolute device identifier. In addition, the media management application 130, and the load accelerator applications 108, 122 can identify devices that they need. In this way, when the media management application 130 issues a "connect" request to the load accelerator application 108, the device identification can be whatever they choose. The load accelerator application 108 converts the device identifier to an absolute device identifier and sends the absolute device identifier to the access control module 135. The access control module 135 then passes the device handle back to the load accelerator application 108, which can then provide it to media management application 130 in the response to the connect request. The media management application 130 can then use the device handle provided by the load accelerator application 108 in its track access requests without having to call the translation function.

In exemplary embodiments, the second server module 120 configures subchannels for the channel subsystem 160 in order to issue I/O operations to the data set 115 where the relational database application 106 data resides. In one example, a base I/O configuration is established via an input-output configuration data set (IOCDS). Once the base configuration is established, it can be extended with the device-configuration mechanism. The device-configuration mechanism is also used to establish a unique identifier (i.e. device handle) for each device that is used by components of the second server module 120. A device configuration has several functions including but not limited to establishing unique identifiers for each I/O device; and 2) adding I/O devices to existing I/O configurations. When the device configuration establishes a unique identifier (i.e., device handle) for each I/O device in the configuration, it also communicates the unique identifier back to load accelerator application 108 for use in subsequent operations in the second server module 120. This identifier is used by the media management application 130 for indicating the device to be used in a track access. The identifier also may be used by the load accelerator application 108 for setting up access controls. As described above, the device configuration also adds I/O devices to an existing I/O configuration in channel subsystem 160 and the channel subsystem access functions module 145 of the second server module 120. The identity of devices to be included in the configuration is sent to the device configuration module 140 by the operating system in the first server module 105 via the management network module 124. The device configuration module 140 causes various I/O operations to be performed to associate I/O devices found in the communication channel 110 with the devices indicated by the load accelerator application 108. The configuration in the second server module 120 may need to be extended to include new devices that are not already represented there. Also, control blocks (UCBs) used by channel subsystem access functions module 145 are added as part of this process if necessary.

In exemplary embodiments, when the channel subsystem 160 starts up, the system controller 164 process accesses an IOCDS file, which describes the base I/O configuration. The system controller 164 uses the information contained in the IOCDS to configure subchannels and other data structures in the second server module 120 before starting the rest of the channel subsystem 160. The IOCDS can describe a full configuration that is not changed during the life of the channel subsystem 160. Alternatively, the IOCDS can merely describe a minimal or "shell" configuration that is extended by the device-configuration mechanism. It is also possible for the IOCDS to describe a partial configuration, that is somewhere between a full configuration and a minimal configuration. In exemplary embodiments, a minimal IOCDS is used initially so that the I/O configuration can be extended as necessary for performing whatever data loads are required during operation, which avoids the need for the customer or field personnel to anticipate the required I/O configuration for all the data loads that will be performed. In addition, the minimal IOCDS avoids the need to create a complicated description of the required I/O configuration in a text file and to prepare an IOCDS from the text file.

In exemplary embodiments I/O configuration can be extended both explicitly and implicitly. When explicit configuration is performed, the load accelerator application 108 sends a request to the device configuration module 140 on the second server module 120, which causes the device configuration module 140 to ensure the specified device is in the I/O configuration. If the device is not in the I/O configuration, the device configuration module 140 issues commands to the channel subsystem 160 to add the device. Although explicit configuration can be performed at any time, the load accelerator application 108 can issue all configuration requests before any data loads are initiated, which ensures that the configuration process does not delay other activity on the second server module 120. Explicit configuration also reduces the time it takes to respond to access control requests from the load accelerator application 108 and the time it takes for devices to be available for track access requests from the media management application 130. When implicit configuration is performed, the load accelerator application 108 sends a request to the access control module 135. If the access control module 135 determines that the device is not represented in the I/O configuration on the second server module 120, the access control module 135 will initiate a request to the device configuration module 140 to add the device. Once the device configuration module 140 completes the configuration process, the access control module 135 can complete the request from the load accelerator application 108. As such, devices are added incrementally, as needed for data loads that are about to be performed.

The device configuration process is now described. The first step in the device-configuration process is to discover the link addresses of each control unit in the communication channel 110 to which the channels are attached. This first step is performed when the device configuration module 140 starts up. The device configuration module 140 issues multiple queries via the channel subsystem access functions module 145 and the channel subsystem 160 to include information for the communications channel 110, including, but not limited to a port type and port identifier (I.e., link address) of a node in the communication channel 110. When all nodes have been queried using, the next step is to determine the node descriptors of each channel control unit. This step and the following step may need to be repeated if a control unit has been added to the communications channel 110. This step is performed when the load accelerator application 108 indicates it wants to include a device on a control unit among that wasn't discovered previously. Once the link addresses of all FICON control units have been discovered, the device configuration module 140 saves all node descriptors. This step immediately follows the link address discovery step and has to be performed on each channel path available in the channel subsystem 160. At this point, the device configuration module 140 issues one or more commands to each physical control unit to discover what control unit images (i.e., LSSs) are available on the control unit, and saves this information. Although the load accelerator application 108 should not ask to configure a control unit image that does not exist, having this information available allows the information to be checked at the time of the configuration request. The device configuration module 140 can also issue one or more commands to each control unit image to discover what unit addresses are available on the control unit image. The load accelerator application 108 should not ask to configure a device that does not exist, but having this information available allows the information to be checked at the time of the configuration request.

In exemplary embodiments, when explicit configuration is being used, the load accelerator application 108 communicates with the device configuration module 140 via the communication channel 123 and the management network module 124 when the load accelerator application 108 needs to indicate devices it wants to allow the second server module 120 to access. The load accelerator application 108 provides the following information at this time for each device: 1) node descriptor of the physical control unit; 2) control unit image (CUADD); and 3) unit address (UNITADD). With explicit configuration, the load accelerator application 108 communicates this information prior to granting access control permissions to a device. Advance communication allows suitable time to add an I/O device to the configuration that may take a lot of time to complete. When implicit configuration is being used, the load accelerator application 108 sends a request to the access control module 135. If the access control module 135 determines that a device is not represented in the configuration, it communicates with the device configuration module 140 to have the device added to the configuration. The device configuration module 140 responds to the command from the load accelerator application 108 (i.e., explicit) or the access control module 135 (i.e., implicit) after a check to see if a corresponding node descriptor is found for at least one of its channels. In addition to a status field (or fields), the response also includes all the information provided in the request. This step may facilitate any housekeeping/correlation the load accelerator application 108 needs to do when it receives the response. This response is returned before device configuration actually adds the devices to the I/O configuration because adding devices to the I/O configuration can take some time to complete.

In the case of explicit configuration, the device configuration module 140 also includes a handle for each device in the response to the load accelerator application 108. In the case of implicit configuration, the device configuration module 140 supplies the handle to the access control module 135, which returns the handle in its response to the load accelerator application 108. The first server module 105 may use this handle when referring to the device in future communications with the relational database application 125 and the media management application 130 in the second server module 120.

In some instances, the second server module 120 may not be able to configure some or all of the devices indicated by the load accelerator application 108. In this case, the device configuration module 140 indicates which devices were not configurable in its response. When this happens, the load accelerator application 108 finds some other way of performing the load (e.g. uses another server module or performs the load itself and sends the information to a coordinator server).

Once the device configuration module 140 has determined that a device is to be added to the configuration, it needs to determine the best path or paths to reach that device. It only needs to do this for devices that are not already configured. First, the device configuration module 140 finds nodes that have the same node descriptor as the load accelerator application 108 provided. If there is only a single node available, then the link address for that node would be selected on that channel. However, if there is more than one link address with the same node descriptor, selecting the correct one is more complicated. Generally speaking, the device configuration module 140 attempts to select link addresses for each channel to reach the control unit that have the best RAS and performance characteristics.

Once optimal paths have been selected for a device that is not already configured, the device configuration module 140 causes the channel subsystem 160 to configure control blocks in the second server module 120 that support the previously unconfigured devices identified by the load accelerator application 108. The device configuration module 140 requests that the channel subsystem access functions module 145 to issue control and configuration commands to the channel subsystem 160. Each time such commands are issued, the channels involved may be temporarily quiesced while various internal tables are rebuilt. Access will stop for some time while this is taking place. Therefore, it is desirable for such additions be made when the second server module 120 activity is at a minimum. After the devices have been added to the configuration, the channel subsystem access functions module 145 is notified to add UCBs for the newly added devices. The channel subsystem access functions module 145 then performs several I/O operations to the newly added devices to get them ready to use (e.g. clear unit checks), set path groups, and sense their capabilities.

In exemplary embodiments, the second server module can cache the latest configuration information in order to avoid having to go through the entire process for new devices each time the second server module 120 starts up. This cached information can then be used the next time the second server module 120 starts up, possibly avoiding the time and disruption to re-establish the previous configuration. Some validation must take place if a configuration is re-established in this way. This would be done as the load accelerator application 108 indicates the devices to be included in the configuration. In exemplary embodiments, a new base IOCDS can be generated reflecting the configuration at shutdown so that it can be used the next time the channel subsystem 160 starts up.

In exemplary embodiments, the I/O configuration may grow as the load accelerator application 108 indicates devices that are needed for second server module 120 operations. Normally, the I/O configuration just accumulates devices and control units. As long as the limits of the channel subsystem 160 are not exceeded, it is not necessary to remove devices.

If the limits of the channel subsystem 160 are likely to be reached, a "release device" request can be provided. Such a request would cause the device configuration module 140 to remove the device from the configuration if all other users of that device have also released the device. To make this determination, a reference count can be maintained of the number of times a device was included by various load accelerator applications such as the load accelerator application 108. In this example, the subchannel/UCB would not be removed until the count goes to zero.

As described herein, the access control module 135 is the component that determines whether a given track access request will be permitted, and is invoked whenever a request coming from the API, such as the access control API 131 and the track access API 132, is one that requires access permission checking. In one example, before the media management application 130 can perform any track accesses, the load accelerator application 108 communicates with the access control module 135 to set up permissions. The load accelerator application 108 includes the following in such requests: 1) a load accelerator application ID; 2) an authorization token; 3) an absolute device identifier; 4) extent ranges and 5) type of permission (e.g. read, write, execute).

The load accelerator application ID is a globally-unique ID that corresponds to an instance of the load accelerator application 108. The load accelerator application ID indicates which instance of the load accelerator application 108 is making the request to set up access permissions. The load accelerator application ID is equivalent to an "Owner ID" for the access permissions. The load accelerator application ID is compared with a similar load accelerator application ID supplied by the media management application 130 when making requests across the track access API 132. The authorization token is unique within the scope of a particular load accelerator application ID. However, the same value may be used by two or more load accelerator application IDs. Consequently, it is accompanied by a load accelerator application ID. The authorization token is compared with a similar token supplied by the media management application 130 when making requests across the track access API 132. The access control database (see below) includes the device handle. The translation function is used by the access control module 135 to convert the absolute device identifier in each request to a device handle. This allows the device handle to be entered into the access control database in order to facilitate processing by the access control module 135. The access control module 135 responds to each request by returning the contents of the request along with status indication and handle for each device. When there is a failure setting up permissions for a device/extent, the load accelerator application 108 finds some other way of performing the load (e.g. use another server module or perform the load itself and send the information to a coordinator server). Although the second server module 120 currently only needs to provide read permission, write and execute permissions are included for other potential applications of the access control module 135. The access control module 135 may determine that the device specified in a request is not currently represented in the I/O configuration. This is a case of implicit configuration. The access control module 135 communicates with device configuration module 140 to have the device added to the I/O configuration on the second server module 120. Other operations in progress on the second server module 120 that require channel access may be delayed while the configuration change is being made. An alternative implementation is to reject the request by the access control module 135 if a device is not configured and let the load accelerator application 108 issue a device configuration module 140 request, followed by a retry of the access control module 135 request.

In exemplary embodiments, the access control module 135 keeps track of permission information in the logical equivalent of a small database. Each database record includes, but is not limited to the following fields: 1) device handle; 2) authorization token; 3) load accelerator application ID; 4) extent ranges; and 5) types of permission. In one example, the media management application 130 makes track access requests via the track access API 132. Among other things, each request includes the following information: 1) load accelerator application ID; 2) authorization token; 3) device handle; 4) extent (e.g., cylinder number and head number); and 5) type of Access (i.e., read or write).

As each request comes in from the media management application 130 via the track access API 132, the access control application 135 searches its database for records for the requested device, load accelerator application ID, and authorization token. If such a record exists where the requested track falls within the extent range and the type of permissions allow the requested access, then the access is permitted. Otherwise it is not allowed and a response is sent back to the media management application 130 via the track access API 132. If the access is permitted, the access control application 135 passes the request along to the channel subsystem access functions module 145.

In exemplary embodiments, there are two paths by which access permissions may be removed: 1) via the management network module 124 and 2) via the access control API 131. Normal operations utilize the management network module 124. The removal operation causes records to be removed from the access control database. Table 1 indicates the different scope of removal operations that can be performed. For each scope of removal (i.e. column in the table), all the indicated items must match for a record to be removed.

TABLE 1

| Scope: | 1 | 2 | 3 | 4 |
|---|---|---|---|---|
| Load Accelerator Application ID | X | X | X | X |
| Authorization Token | | X | X | X |
| Absolute Device Identifier | | | X | X |
| Extent Range | | | | X |

The access control module 135 responds to a removal request by returning the content of the request along with a status indicating the success or failure of the removal operation. The access control API 131 is provided for certain recovery scenarios. Scope #1 from Table 1 (i.e. by the load accelerator application ID) can be performed via the access control API 131. This is equivalent of a "purge all by owner". Requests to remove access permissions that do not currently exist are reported with a special status code.

EXAMPLES

The systems and methods described above are described with respect to the second server module being a load accelerator running on an x86 blade in an IBM® BladeCenter®. The operating system used is the SUSE distribution of x86 Linux® and there is no hypervisor in the load accelerator. However, many of the concepts described above can be utilized in other environments with and without hypervisors. For example, the load accelerator can be implemented in a z/VM® partition running Linux® guests on an IBM® z/Architecture® mainframe. In this case, the load accelerator is coupled to the coordinator blades in the Smart Analytics Optimizer by a high-speed data network. One guest serves as a "system" guest that runs Linux® and provides Access Control and other services to another guest. This other guest also uses Linux® and this is where Accelerator zAAM, DB2 Lite, and Media Manager Lite run. The load accelerator is able to access the DB2 data using FICON channels on the mainframe and then transfer it to the Smart Analytics Optimizer via the network. This reduces the cost of performing the load operation on z/OS®.

Some of the functions of the Channel Subsystem Access Functions are not needed in the system guest because these are provided by the underlying Linux® operating system. Device Configuration would have to work differently in this environment because Linux® currently does not have the ability to issue some of the required commands to the channel subsystem.

In another example, the load accelerator can be implemented in a hypervised environment. In this case, the components below the "new" APIs would run in a hypervisor. These include Device Configuration, Access Control, and the Channel Subsystem Access Functions. The components above the "new" APIs would run in a virtual guest on top of the hypervisor. The new APIs would be the same, but would be implemented such that they communicate with Access Control and the Channel Subsystem Access Functions via paravirtualized device drivers. Consequently, no change would be needed to the components calling the new APIs. One advantage of using a hypervised environment is to provide security for Access Control. The firmware running on the hypervisor is developed, tested, controlled, distributed, and installed by the provider. Another advantage is that less secure software (i.e. not controlled like firmware) can run in the virtual guest. This software can directly access data on FICON-attached ECKD DASD. Access Control ensures that only specific devices and extents authorized by some component on z/OS® (e.g. zAAM) can be accessed by the software running in the virtual guests.

The software that runs in a virtual guest could be Accelerator zAAM, Media Manager Lite, and DB2 Lite. In this case, they would be used for applications other than the Smart Analytics Optimizer Load Accelerator. Alternatively, it could be software that is not developed or controlled by the provider. This enables a range of new applications that could run on a blade and access data on FICON-attached ECKD DASD when granted proper permissions by z/OS®.

Figure 3:
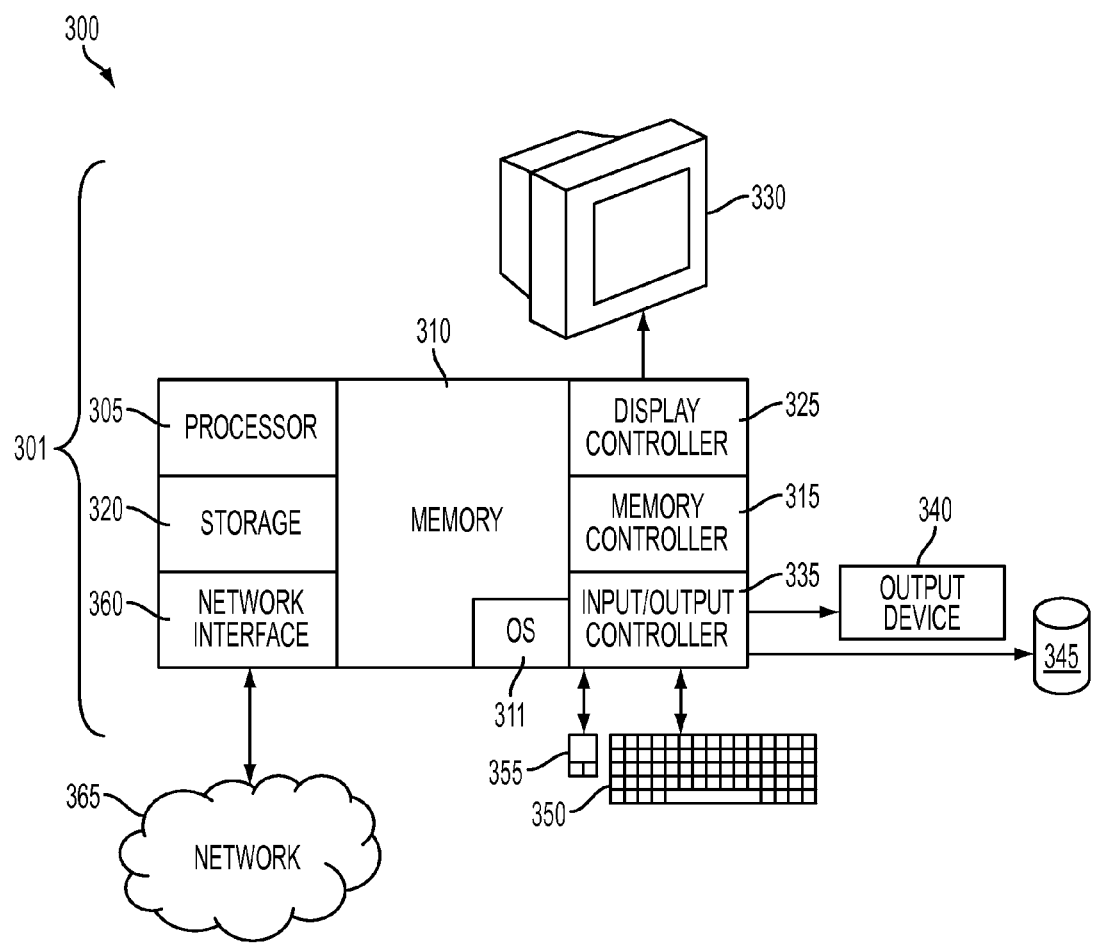
FIG. 3 illustrates an exemplary embodiment of a system that can be implemented to grant access to data among systems that are authorized to access the data and systems that are not authorized to access the data in a multi mainframe environment.

The first and second server modules 105, 120 can be any suitable computing system as now described. FIG. 3 illustrates an exemplary embodiment of a system 300 that can be implemented to grant access to data among systems that are authorized to access the data and systems that are not authorized to access the data in a multi mainframe environment. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 300 therefore includes general-purpose computer 301.

In exemplary embodiments, in terms of hardware architecture, as shown in FIG. 3, the computer 301 includes a processor 305, memory 310 coupled to a memory controller 315, and one or more input and/or output (I/O) devices 340, 345 (or peripherals) that are communicatively coupled via a local input/output controller 335. The input/output controller 335 can be, but is not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing software instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The software in memory 310 may include one or more separate programs, each of which comprises an ordered listing of executable instructions for implementing logical functions. In the example of FIG. 3, the software in the memory 310 includes the data access methods described herein in accordance with exemplary embodiments and a suitable operating system (OS) 311. The OS 311 essentially controls the execution of other computer programs, such the data access systems and methods as described herein, and provides scheduling, input-output control, file and data management, memory management, and communication control and related services.

The data access methods described herein may be in the form of a source program, executable program (object code), script, or any other entity comprising a set of instructions to be performed. When a source program, then the program needs to be translated via a compiler, assembler, interpreter, or the like, which may or may not be included within the memory 310, so as to operate properly in connection with the OS 311. Furthermore, the data access methods can be written as an object oriented programming language, which has classes of data and methods, or a procedure programming language, which has routines, subroutines, and/or functions.

In exemplary embodiments, a conventional keyboard 350 and mouse 355 can be coupled to the input/output controller 335. Other output devices such as the I/O devices 340, 345 may include input devices, for example but not limited to a printer, a scanner, microphone, and the like. Finally, the I/O devices 340, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In exemplary embodiments, the system 300 can further include a network interface 360 for coupling to a network 365. The network 365 can be an IP-based network for communication between the computer 301 and any external server, client and the like via a broadband connection. The network 365 transmits and receives data between the computer 301 and external systems. In exemplary embodiments, network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 301 is a PC, workstation, intelligent device or the like, the software in the memory 310 may further include a basic input output system (BIOS) (omitted for simplicity). The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute software stored within the memory 310, to communicate data to and from the memory 310, and to generally control operations of the computer 301 pursuant to the software. The data access methods described herein and the OS 311, in whole or in part, but typically the latter, are read by the processor 305, perhaps buffered within the processor 305, and then executed.

When the systems and methods described herein are implemented in software, as is shown in FIG. 3, the methods can be stored on any computer readable medium, such as storage 320, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the data access methods are implemented in hardware, the data access methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include serializing access to data sets in systems that support data access from systems that do not support data access.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer program product including a non-transitory computer readable medium storing instructions for causing a computer to implement a heterogeneous operating system data access method, the method comprising:
   receiving, in a first computing system having a first operating system, a request from a second computing system to access a data set, wherein the second computing system has a second operating system dissimilar to the first operating system;
   preparing, by the first computing system, the data set for access by the second computing system;
   determining, by the first computing system, characteristics of the data set;
   passing the characteristics of the data set from the first computing system to the second computing system;
   setting, by the first computing system, permissions for the second computing system to access the data set;
   confirming, in the second computing system, that the second computing system has been granted access to the data set;
   coordinating, in the second computing system, access to the data set;
   granting the second computing system, by the first computing system, access to the data set, the access including a type of access and an extent of the type of access to which the second computing system can access the data set; and
   notifying, from the second computing system to the first computing system, that the second computing system accessed the data set.

2. The computer program product as claimed in claim 1 wherein the second computing system is not authorized to access the data set prior to issuing the request to the first computing system to access the data set.

3. The computer program product as claimed in claim 2 wherein the first computing system is authorized to access the data set, and to permit the second computing system to access the data set.

4. The computer program product as claimed in claim 3 wherein the second computing system issues internal commands to identify and access the data set for applications residing on the second computing system.

5. The computer program product as claimed in claim 4 wherein the method further comprises removing, by the first computing system, permissions granted to the second computing system.

6. A heterogeneous computing system, comprising:
   a first server module having a first operating system;
   a second server module communicatively coupled to the first server module, the second server module having a second operating system dissimilar to the first operating system;
   a data set accessible by the first server module and the second server module, wherein the data set is disposed on the first server module;
   a first process residing on the first server module, the first process configured to grant permissions and access to the second server module, from the first server module, to the data set, the access including a type of access and an extent of the type of access to which the second server module can access the data set, and
   a second process residing on the second server module, the second process configured to confirm that access to the data set has been granted to the second server module and to coordinate access to the data set;
   wherein the first process is configured to receive a request from a second computing system to access a data set, prepare, the data set for access by the second computing system, determine characteristics of the data set, pass the characteristics of the data set from the first computing system to the second computing system, set permissions for the second computing system to access the data set, grant the second computing system access to the data set, and
   wherein the second process is configured to notify the first computing system that the second computing system accessed the data set.

7. The system as claimed in claim 6 wherein the second computing system issues internal commands to identify and access the data set for applications residing on the second computing system.

8. The system as claimed in claim 6 wherein the first process is further configured to receive a notification that the data set has been accessed.

9. The system as claimed in claim 6 wherein the first process is further configured to remove granted permissions.

10. A heterogeneous operating system data access method, comprising:
    receiving, in a first computing system having a first operating system, a request from a second computing system to access a data set, wherein the second computing system has a second operating system dissimilar to the first operating system;
    preparing, by the first computing system, the data set for access by the second computing system;
    determining, by the first computing system, characteristics of the data set;
    passing the characteristics of the data set from the first computing system to the second computing system;
    setting, by the first computing system, permissions for the second computing system to access the data set;
    confirming, in the second computing system, that the second computing system has been granted access to the data set;
    coordinating, in the second computing system, access to the data set;
    granting the second computing system, by the first computing system, access to the data set, the access including a type of access and an extent of the type of access to which the second computing system can access the data set; and
    notifying, from the second computing system to the first computing system, that the second computing system accessed the data set.

11. The method as claimed in claim 10 wherein the second computing system is not authorized to access the data set prior to issuing the request to the first computing system to access the data set.

12. The method as claimed in claim 11 wherein the first computing system is authorized to access the data set, and to permit the second computing system to access the data set.

13. The method as claimed in claim 12 wherein the second computing system issues internal commands to identify and access the data set for applications residing on the second computing system.

14. The method as claimed in claim 13 further comprising removing, by the first computing system, permissions granted to the second computing system.

* * * * *